United States Patent
Chen et al.

(10) Patent No.: US 12,418,453 B2
(45) Date of Patent: Sep. 16, 2025

(54) METHOD AND SYSTEM FOR UPDATING ALARM STATUS OF DEVICE, APPARATUS, AND ELECTRONIC DEVICE

(71) Applicant: ZTE Corporation, Shenzhen (CN)

(72) Inventors: Yafei Chen, Shenzhen (CN); Jian Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/573,223

(22) PCT Filed: Jun. 10, 2022

(86) PCT No.: PCT/CN2022/098230
§ 371 (c)(1),
(2) Date: Dec. 21, 2023

(87) PCT Pub. No.: WO2023/273841
PCT Pub. Date: Jan. 5, 2023

(65) Prior Publication Data
US 2024/0283696 A1    Aug. 22, 2024

(30) Foreign Application Priority Data
Jun. 29, 2021  (CN) ............................. 202110729331

(51) Int. Cl.
*H04L 41/0604* (2022.01)
*H04L 41/0677* (2022.01)

(52) U.S. Cl.
CPC ...... *H04L 41/0627* (2013.01); *H04L 41/0677* (2013.01)

(58) Field of Classification Search
CPC ........................ H04L 41/0627; H04L 41/0677
See application file for complete search history.

(56) References Cited

U.S. PATENT DOCUMENTS 10,140,834 B2 * 11/2018 Barcala ................. G06F 1/3209
10,826,947 B2 * 11/2020 Smith ..................... H04L 67/02
(Continued)

FOREIGN PATENT DOCUMENTS

| CN | 101188528 A | 5/2008 |
| CN | 101667922 A | 3/2010 |

(Continued)

OTHER PUBLICATIONS

Jukic et al,, "Fault Management API for SNMP agents", 2019 42nd international Convention on Information and Communication Technologyh, Electronics and Microelectronics, May 20, 2019, IEEE Publishing.*

(Continued)

*Primary Examiner* — Todd L Barker
(74) *Attorney, Agent, or Firm* — CANTOR COLBURN LLP

(57) ABSTRACT

Embodiments of the present disclosure provide a method for updating an alarm status of a device, performed by a device alarm status presentation apparatus, including: parsing a received alarm status change message to obtain a device identifier set, wherein the device identifier set contains a device identifier of each device whose alarm status has changed; updating a globally unique flag according to the alarm status change message; sending a query request carrying the device identifier set to a query executer; and determining whether to update the alarm status of the device according to the current globally unique flag and a query response returned by the query executer.

20 Claims, 7 Drawing Sheets

(56) References Cited

U.S. PATENT DOCUMENTS

| | | | |
|---|---|---|---|
| 2004/0162810 | A1 | 8/2004 | Jeon |
| 2016/0294614 | A1* | 10/2016 | Searle ............... H04L 67/34 |
| 2017/0134395 | A1 | 5/2017 | Enns et al. |
| 2018/0061212 | A1* | 3/2018 | Dayalan ............... G08B 25/10 |

FOREIGN PATENT DOCUMENTS

| | | |
|---|---|---|
| CN | 102014012 A | 4/2011 |
| CN | 102882723 A | 1/2013 |
| CN | 103023676 A | 4/2013 |
| CN | 106301890 A | 1/2017 |
| CN | 111143155 A | 5/2020 |
| EP | 3206334 A1 | 8/2017 |

OTHER PUBLICATIONS

Wang et al, "Efficient alarm behavior analytics for telecom networks", Information Sciences, vol. 402, Sep. 2017, Elsevieer Publhing.*

Lee et al., "Service-Oriented Software Framework for Network Management", International Conference on Advanced Software Engineering and Its Applications, 2010.*

International Search Report for corresponding application PCT/CN2022/098230 filed Jun. 10, 2022; Mail date Aug. 30, 2022.

European Search Report for corresponding EP22831661; Report dated Aug. 5, 2024.

* cited by examiner

METHOD AND SYSTEM FOR UPDATING ALARM STATUS OF DEVICE, APPARATUS, AND ELECTRONIC DEVICE

CROSS-REFERENCE TO RELATED APPLICATION

The present disclosure is a National Stage Filing of the PCT International Application No. PCT/CN2022/098230 filed on Jun. 10, 2022, which claims priority to Chinese Patent Application CN202110729331.9, filed on Jun. 29, 2021 and entitled "Method and System for Updating Alarm Status of Device, Apparatus, and Electronic Device", the disclosure of which is hereby incorporated by reference in its entirety.

TECHNICAL FIELD

The present disclosure relates to the technical field of telecommunication device network management, and in particular to a method and system for updating an alarm status of a device, an apparatus, an electronic device, and a computer storage medium.

BACKGROUND

In a telecommunication network, a device generates an alarm when an abnormality occurs and generates an alarm recovery when the abnormality is eliminated, that is, an alarm status of the device changes. A telecommunication device network management system (hereinafter referred to as a network management for short) needs to display the above alarm status of the device, and the function of displaying the alarm status of the device has a basic requirement for accuracy and timeliness.

A device alarm status change collection apparatus (hereinafter referred to as a collection apparatus for short) of the network management periodically (the period is recorded as I1) collects a device ID list of each device whose alarm status has changed in the network, and sends a device alarm status change message containing the device ID list of each device whose alarm status has changed to a device alarm status presentation apparatus (hereinafter referred to as a presentation apparatus for short) of the network management. After receiving the device alarm status change message, the presentation apparatus parses the device ID list of each device whose alarm status has changed from the device alarm status change message, and sends a request containing the device ID list of each device whose alarm status has changed to a device alarm status query apparatus (hereinafter referred to as a query apparatus for short) to query the alarm status of each device corresponding to the device ID list of each device whose alarm status has changed. The query apparatus returns a response containing the alarm status of each device corresponding to the device ID list of each device whose alarm status has changed, and the presentation apparatus updates the alarm status of each related device accordingly. The process of the presentation apparatus from sending the query request to receiving the query response and completing the update display is called a device alarm status change message processing flow; and the duration consumed by this process is recorded as I2.

In order to display the alarm status of the device timely, I1 may be set to be smaller, usually less than I2, so that a plurality of device alarm status change messages may arrive at the presentation apparatus within one I2 time period, causing a problem of device alarm timing in this scenario, that is, an alarm of the device is earlier than the reporting of an alarm recovery, but the alarm recovery is earlier than the completion of the processing of the alarm, resulting in an erroneous presentation of the alarm status of the device. As shown in FIG. 1, a device alarm status change message corresponding to the alarm of the device at a moment T0 triggers a query request, an alarm status corresponding to the alarm of the device is returned as a result in response to the query request, and the presentation apparatus updates the display of the alarm status accordingly. This process takes a time of I2 (T3−T0). A device alarm status change message corresponding to the alarm recovery of the device at a moment T1 (T0+I1) triggers a query request again, an alarm status corresponding to the alarm recovery of the device is returned as a result in response to the query request, and the presentation apparatus updates the display of the alarm status accordingly. This process takes a time of I3 (T2−T1). The alarm recovery is earlier than the completion of the processing of the alarm (T2<T3), and the finally presented alarm status of the device shows that there is an alarm, which is inconsistent with the actual alarm recovery result, causing the problem of false alarm.

SUMMARY

In order to solve the above technical problems, the embodiments of the present disclosure provide a method for updating an alarm status of a device, which may accurately and timely reflect the alarm status of the device.

The above technical purpose of the present disclosure is implemented through the following technical solutions.

In a first aspect, the embodiments of the present disclosure provide a method for updating an alarm status of a device, performed by a device alarm status presentation apparatus, including the following operations.

A received alarm status change message is parsed to obtain a device identifier set. The device identifier set contains a device identifier of each device whose alarm status has changed.

A globally unique flag is updated according to the alarm status change message.

A query request carrying the device identifier set is sent to a query executer.

Whether to update the alarm status of the device is determined according to the current globally unique flag and a query response returned by the query executer.

In a second aspect, the embodiments of the present disclosure provide a method for updating an alarm status of a device, performed by a device alarm status query apparatus, including the following operations.

After a presentation apparatus updates a globally unique flag according to an alarm status change message, a query executer receives a query request sent by the presentation apparatus. The query request carries a device identifier set obtained by parsing the alarm status change message, and the device identifier set contains a device identifier of each device whose alarm status has changed.

The query executer queries the corresponding alarm status of the device according to the device identifier carried in the query request.

The query executer provides a corresponding query response for the presentation apparatus, so that the presentation apparatus determines whether to update the alarm status of the device according to the query response and the current globally unique flag.

In a third aspect, the embodiments of the present disclosure further provide a device alarm status presentation apparatus, including a first receiving module, an update module, a first sending module, and a determination module.

The first receiving module may be configured to receive an alarm status change message, and parse the received alarm status change message to obtain a device identifier set. The device identifier set contains a device identifier of each device whose alarm status has changed.

The update module may be configured to update a globally unique flag according to the received alarm status change message.

The first sending module may be configured to send a query request carrying the device identifier set to a query executer.

The determination module may be configured to update the alarm status of the device according to the current globally unique flag and a query response returned by the query executer.

In a fourth aspect, the embodiments of the present disclosure further provide a device alarm status query apparatus, including a second receiving module, a query module, and a second sending module.

The second receiving module is configured to receive, after a presentation apparatus updates a globally unique flag according to an alarm status change message, a query request sent by the presentation apparatus. The query request carries a device identifier set obtained by parsing the alarm status change message, and the device identifier set contains a device identifier of each device whose alarm status has changed.

The query module may be configured to query, according to the device identifier carried in the query request, the corresponding alarm status of the device.

The second sending module may be configured to return a query response to the presentation apparatus, so that the presentation apparatus determines whether to update the alarm status of the device according to the query response and the current globally unique flag.

In a fifth aspect, the embodiments of the present disclosure further provide a system for updating an alarm status of a device, including a collection apparatus, a presentation apparatus, and a query apparatus.

The collection apparatus may be configured to periodically collect a device identifier set of devices whose alarm status has changed in a network, and send the device identifier set to a presentation apparatus through an alarm status change message.

The presentation apparatus may be configured to receive the alarm status change message containing the device identifier set sent by the collection apparatus: update a globally unique flag according to the alarm status change message; and send a query request carrying the device identifier set to a query executer.

The query apparatus may be configured to receive the query request for the alarm status of the device; and provide a corresponding query response according to the received query request.

The presentation apparatus may be further configured to determine whether to update the alarm status of the device according to the query response returned by the query executer and the current globally unique flag.

In a sixth aspect, the embodiments of the present disclosure further provide an electronic device, which may include a processor and a memory.

The memory may be configured to store a computer-executable instruction. The computer-executable instruction, when being executed by the processor, causes the processor to perform the operations of the method for updating the alarm status of the device in the first aspect.

In a seventh aspect, the embodiments of the present disclosure further provide an electronic device, which may include a processor and a memory.

The memory may be configured to store a computer-executable instruction. The computer-executable instruction, when being executed by the processor, causes the processor to perform the operations of the method for updating the alarm status of the device in the second aspect.

In an eighth aspect, the embodiments of the present disclosure further provide a computer-readable storage medium. The computer-readable storage medium stores one or more programs, and the one or more programs are executed by an electronic device including a plurality of application programs to cause the electronic device to perform the operations of the method for updating the alarm status of the device in the first aspect.

In a ninth aspect, the embodiments of the present disclosure further provide a computer-readable storage medium. The computer-readable storage medium stores one or more programs, and the one or more programs are executed by an electronic device including a plurality of application programs to cause the electronic device to perform the operations of the method for updating the alarm status of the device in the second aspect.

DETAILED DESCRIPTION

In order to make the above purposes, features and advantages of the present disclosure clearer and understandable, the technical solutions in the embodiments of the present disclosure will be clearly and completely described below in combination with the drawings in the embodiments of the present disclosure. It is to be noted that the embodiments in the present disclosure and features in the embodiments may be combined with each other without conflict.

The embodiments of the present disclosure will be described in detail below with reference to the drawings.

The embodiments of the present disclosure provide a method for updating an alarm status of a device, performed by a device alarm status presentation apparatus, including the following operations.

A received alarm status change message is parsed to obtain a device identifier set. The device identifier set contains a device identifier of each device whose alarm status has changed.

A globally unique flag is updated according to the alarm status change message.

A query request carrying the device identifier set is sent to a query executer.

Whether to update the alarm status of the device is determined according to the current globally unique flag and a query response returned by the query executer.

Embodiment 1

Figure 1:
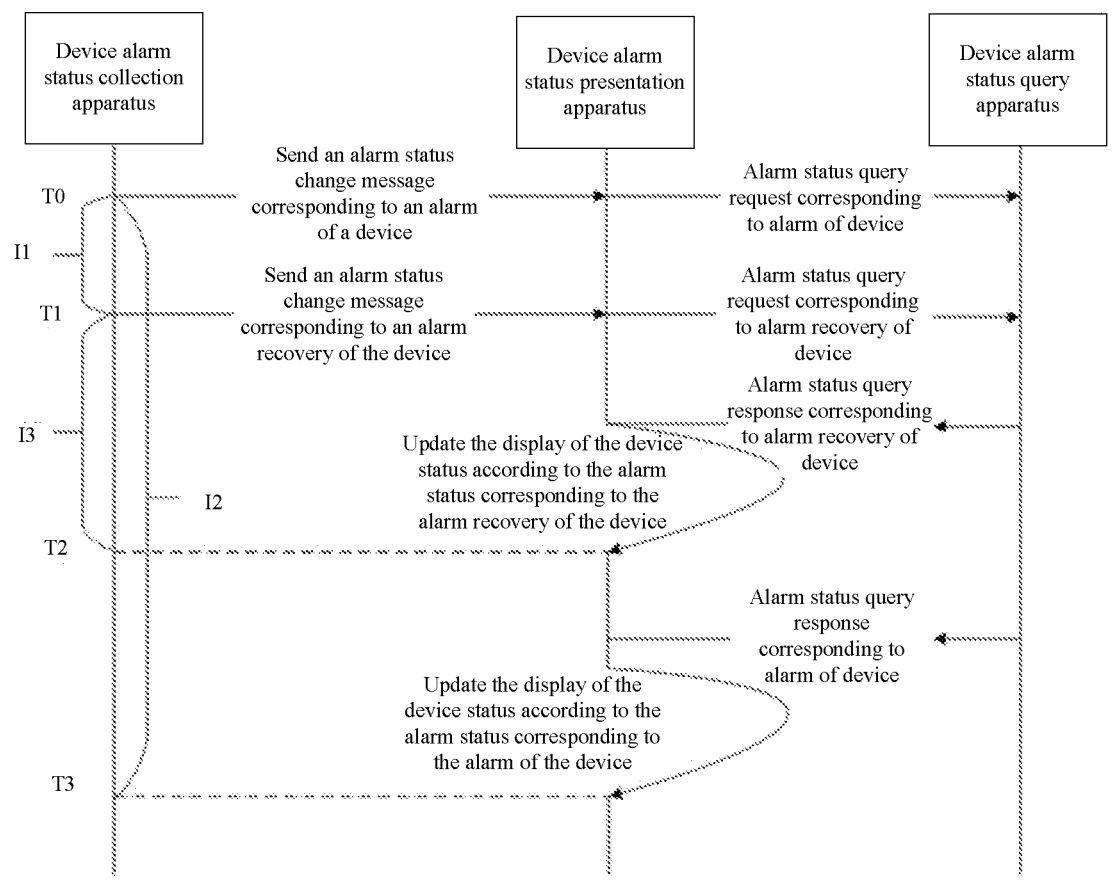
FIG. 1 is a flowchart of an out-of-order update of an alarm status of a device existing in the related art.
Figure 2:
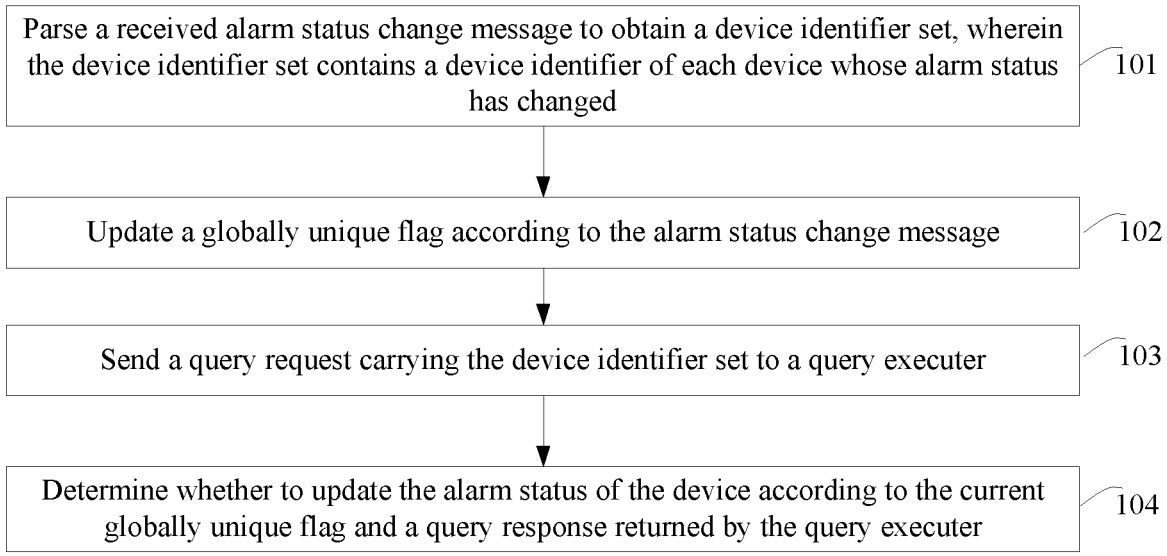
FIG. 2 is a flowchart of a method for updating an alarm status of a device according to an embodiment of the present disclosure.

FIG. 2 is a flowchart of a method for updating an alarm status of a device according to an embodiment of the present disclosure. The flow of the method for updating the alarm status of the device in the embodiments of the present disclosure will be described in detail below with reference to FIG. 2.

First, at S101, a received alarm status change message is parsed to obtain a device identifier set. The device identifier set contains a device identifier of each device whose alarm status has changed.

In some exemplary implementations, a collection apparatus periodically collects the device identifier set of devices whose alarm status has changed in a network.

In some exemplary implementations, the device identifier set is a device ID list.

In some exemplary implementations, the device ID list of each device whose alarm status has changed is sent by the collection apparatus to a presentation apparatus in the form of a device alarm status change message.

In some exemplary implementations, the presentation apparatus receives the alarm status change message and parses the alarm status change message to obtain the device identifier set.

At S102, a globally unique flag is updated according to the alarm status change message.

In the embodiments of the present disclosure, the globally unique flag may be any form of unique flag, which is not limited to a timestamp. The operation of updating the locally maintained globally unique flag according to the received alarm status change message may be implemented in the following manner: the globally unique flag is updated accordingly each time the device alarm status change message is received. The collection apparatus periodically collects the device identifier of each device whose alarm status of the device has changed, so that each device alarm status change message may contain a plurality of device identifiers of devices whose alarm status of the device has changed.

In some exemplary implementations, the globally unique flag is a globally unique TiGID.

In some exemplary implementations, the presentation apparatus locally maintains the globally unique TiGID.

In some exemplary implementations, the maintenance of the globally unique TiGID is not limited to be performed locally, but may be performed in other storage spaces or in the cloud.

In some exemplary implementations, the above TiGID has a property of increasing over time (of course, the above TiGID may be assigned with a property of changing over time as required). That is, each time a device alarm status change message is received, a new TiGID is obtained and overwrites the old TiGID, that is, the TiGID is updated.

In some exemplary implementations, the above TiGID may be generated by the presentation apparatus or the collection apparatus or other independent apparatuses.

At S103, a query request carrying the device identifier set is sent to a query executer.

In some exemplary implementations, the presentation apparatus parses the device alarm status change message to obtain the device ID list of each device whose alarm status has changed, and sends the query request to a query apparatus to query the alarm status of each device corresponding to the device ID list of each device whose alarm status has changed.

In some exemplary implementations, the query request sent by the presentation apparatus contains following fields: a TiGID field and a device ID list field.

The TiGID field records the current TiGID field maintained by the presentation apparatus.

The device ID list field whose alarm status has changed is the device ID list of each device whose alarm status has changed parsed from the alarm status change message.

In some exemplary implementations, the query request carrying the device identifier set is sent to the query executer, so that the query executer queries the alarm status of the device corresponding to each device identifier in the device identifier set.

In some exemplary implementations, the query request carries the updated globally unique flag and the device ID list.

In some exemplary implementations, after receiving the query request, the query apparatus queries, in the maintained device alarm information, the corresponding alarm status of the device according to the device ID list of each device whose alarm status has changed in the query request, and returns the corresponding alarm status of the device and the TiGID copied from the query request to the presentation apparatus.

At S104, whether to update the alarm status of the device is determined according to the current globally unique flag and a query response returned by the query executer.

In some exemplary implementations, whether the globally unique flag carried in the query response is consistent with the locally maintained globally unique flag is determined according to the query response returned by the query executer.

In some exemplary implementations, after receiving the query response returned by the query apparatus, the presentation apparatus compares the current TiGID maintained by the presentation apparatus with the TiGID in the query response to determine whether to present the alarm status in the query response.

In some exemplary implementations, when the current TiGID maintained by the presentation apparatus is consistent with the TiGID in the query response (that is, the same TiGID), the alarm status of the device corresponding to each device identifier in the query response is presented.

In some exemplary implementations, when the current TiGID and the TiGID in the query response are the same, the presentation apparatus updates the display of the alarm status according to the alarm status of the device in the query response.

In some exemplary implementations, when the current TiGID maintained by the presentation apparatus is not consistent with the TiGID in the query response (that is, the two are not the same TiGID), the query response is discarded without processing.

In some exemplary implementations, when the current TiGID and the TiGID in the query response are different, it indicates that the presentation apparatus receives a new device alarm status change message, and the presentation apparatus discards the query response without processing.

According to the method for updating the alarm status of the device in the embodiments of the present disclosure, the problem of false alarm caused by the out-of-order processing of the alarm and alarm recovery of the device due to the parallel processing of the device alarm status change messages is eliminated, the accuracy of presentation of the alarm status of the device is significantly enhanced, and the ability of a network management system to process the alarm information is improved, thereby satisfying the demand of the user for the network management system to accurately and timely display the alarm status of the device in a telecommunication network.

The embodiments of the present disclosure further provide a method for updating an alarm status of a device, performed by a device alarm status query apparatus, including the following operations.

After a presentation apparatus updates a globally unique flag according to an alarm status change message, a query executer receives a query request sent by the presentation apparatus. The query request carries a device identifier set obtained by parsing the alarm status change message, and the device identifier set contains a device identifier of each device whose alarm status has changed.

The query executer queries the corresponding alarm status of the device according to the device identifier carried in the query request.

The query executer provides a corresponding query response for the presentation apparatus, so that the presentation apparatus determines whether to update the alarm status of the device according to the query response and the current globally unique flag.

Embodiment 2

Figure 3:
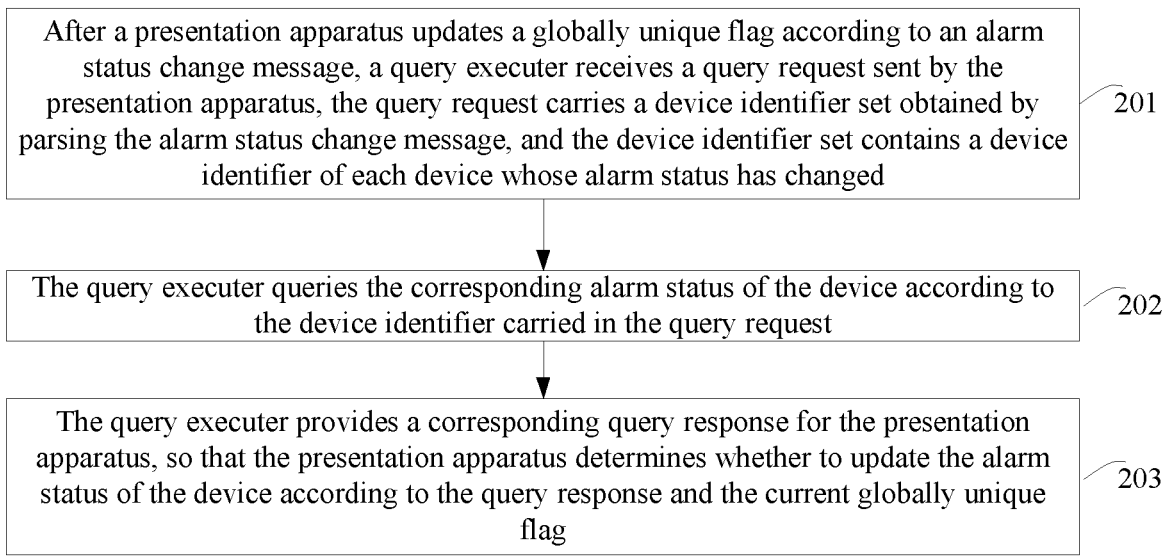
FIG. 3 is a flowchart of another method for updating an alarm status of a device according to an embodiment of the present disclosure.

FIG. 3 is a flowchart of another method for updating an alarm status of a device according to an embodiment of the present disclosure. The flow of the method for updating the alarm status of the device in the embodiments of the present disclosure will be described in detail below with reference to FIG. 3.

First, at S201, after a presentation apparatus updates a globally unique flag according to an alarm status change message, a query executer receives a query request sent by the presentation apparatus. The query request carries a device identifier set obtained by parsing the alarm status change message, and the device identifier set contains a device identifier of each device whose alarm status has changed.

In some exemplary implementations, the presentation apparatus updates the globally unique flag according to the alarm status change message.

In some exemplary implementations, the presentation apparatus locally maintains a globally unique TiGID.

In some exemplary implementations, the maintenance of the globally unique TiGID is not limited to be performed locally, but may be performed in other storage spaces or in the cloud.

In some exemplary implementations, the above TiGID has a property of increasing over time (of course, the above TiGID may be assigned with a property of changing over time as required). That is, each time a device alarm status change message is received, a new TiGID is obtained and overwrites the old TiGID, that is, the TiGID is updated.

In some exemplary implementations, the query apparatus receives the query request for the alarm status of the device sent by the presentation apparatus.

In some exemplary implementations, the query request for the alarm status of the device sent by the presentation apparatus carries the device identifier set obtained by parsing the alarm status change message.

In some exemplary implementations, the device identifier set contains a device identifier of each device whose alarm status has changed.

At S202, the query executer queries the corresponding alarm status of the device according to the device identifier carried in the query request.

In some exemplary implementations, the query request carries the device identifier set.

In some exemplary implementations, the query apparatus queries the corresponding alarm status of the device according to each device identifier.

In some exemplary implementations, the query request carries the updated globally unique flag and the device ID list.

In some exemplary implementations, after receiving the query request, the query apparatus queries, in the maintained device alarm information, the corresponding alarm status of the device according to the device ID list of each device whose alarm status has changed in the query request, and copies the TiGID from the query request.

At S203, the query executer provides a corresponding query response for the presentation apparatus, so that the presentation apparatus determines whether to update the alarm status of the device according to the query response and the current globally unique flag.

In some exemplary implementations, the query apparatus returns the corresponding query response to the presentation apparatus.

In some exemplary implementations, the query response carries the TiGID copied from the query request, and the corresponding alarm status of the device queried in the maintained device alarm information according to the device ID list of each device whose alarm status has changed in the query request.

In some exemplary implementations, the presentation apparatus determines, according to the query response, whether the globally unique flag carried in the query response is consistent with the locally maintained globally unique flag.

In some exemplary implementations, the current TiGID maintained by the presentation apparatus is compared with the TiGID in the query response to determine whether to update the alarm status of the device.

When the current TiGID maintained by the presentation apparatus is consistent with the TiGID in the query response (that is, the same TiGID), the alarm status of the device corresponding to each device identifier in the query response is presented.

In some exemplary implementations, when the current TiGID and the TiGID in the query response are the same, the display of the alarm status is updated according to the alarm status of the device in the query response.

In some exemplary implementations, when the current TiGID maintained by the presentation apparatus is not consistent with the TiGID in the query response (that is, the two are not the same TiGID), the query response is discarded without processing.

In some exemplary implementations, when the current TiGID and the TiGID in the query response are different, it indicates that there is a new device alarm status change message, and the query response is discarded without processing.

According to the method for updating the alarm status of the device in the embodiments of the present disclosure, the problem of false alarm caused by the out-of-order processing of the alarm and alarm recovery of the device due to the parallel processing of the device alarm status change messages is eliminated, the accuracy of presentation of the alarm status of the device is significantly enhanced, and the ability of a network management system to process the alarm information is improved, thereby satisfying the demand of the user for the network management system to accurately and timely display the alarm status of the device in a telecommunication network.

The embodiments of the present disclosure further provide a device alarm status presentation apparatus, including a first receiving module, an update module, a first sending module, and a determination module.

The first receiving module is configured to receive an alarm status change message, and parse the received alarm status change message to obtain a device identifier set. The device identifier set contains a device identifier of each device whose alarm status has changed.

The update module is configured to update a globally unique flag according to the received alarm status change message.

The first sending module is configured to send a query request carrying the device identifier set to a query executer.

The determination module is configured to update the alarm status of the device according to the current globally unique flag and a query response returned by the query executer.

Embodiment 3

Figure 4:
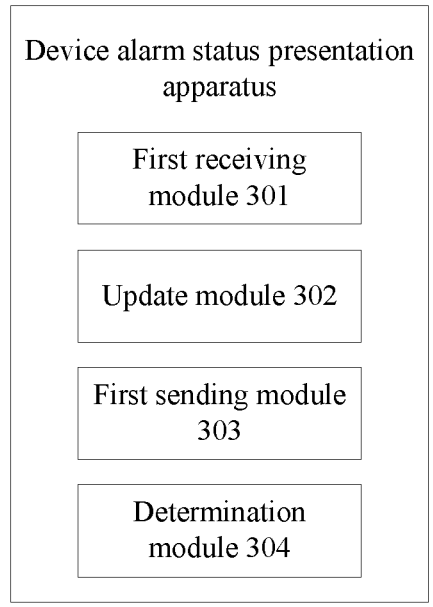
FIG. 4 is a schematic diagram of a device alarm status presentation apparatus according to an embodiment of the present disclosure.

FIG. 4 is a schematic diagram of a device alarm status presentation apparatus according to an embodiment of the present disclosure. As shown in FIG. 4, the device alarm status presentation apparatus in the embodiments of the present disclosure includes a first receiving module 301, an update module 302, a first sending module 303, and a determination module 304.

The first receiving module 301 is configured to receive an alarm status change message, and parse the received alarm status change message to obtain a device identifier set. The device identifier set contains a device identifier of each device whose alarm status has changed.

In some exemplary implementations, the device identifier set is a device ID list.

In some exemplary implementations, the device identifier of each device whose alarm status of the device has changed is collected periodically, so that each alarm status change message may contain one or more device identifiers of devices whose alarm status of the device has changed.

The update module 302 is configured to update a locally maintained globally unique flag according to the received alarm status change message.

In some exemplary implementations, the update module 302 may update the locally maintained globally unique flag as long as the alarm status change message is received.

The first sending module 303 is configured to send a query request carrying the device identifier set to a query executer, so that the query executer queries the alarm status of the device corresponding to each device identifier in the device identifier set.

The determination module 304 is configured to update the alarm status of the device according to the current globally unique flag and a query response returned by the query executer.

In some exemplary implementations, whether the globally unique flag carried in the query response is consistent with the locally maintained globally unique flag is determined according to the query response returned by the query executer.

In some exemplary implementations, the globally unique flag is a globally unique TiGID.

In some exemplary implementations, when the globally unique flag carried in the query response is consistent with the current globally unique flag, the alarm status of the device corresponding to each device identifier in the query response is presented. When the globally unique flag carried in the query response is not consistent with the current globally unique flag, the query response is discarded without processing.

The embodiments of the present disclosure further provide a device alarm status query apparatus, including a second receiving module, a query module, and a second sending module.

The second receiving module is configured to receive, after a presentation apparatus updates a globally unique flag according to an alarm status change message, a query request sent by the presentation apparatus. The query request carries a device identifier set obtained by parsing the alarm status change message, and the device identifier set contains a device identifier of each device whose alarm status has changed.

The query module is configured to query, according to the device identifier carried in the query request, the corresponding alarm status of the device.

The second sending module is configured to return a query response to the presentation apparatus, so that the presentation apparatus determines whether to update the alarm status of the device according to the query response and the current globally unique flag.

Embodiment 4

Figure 5:
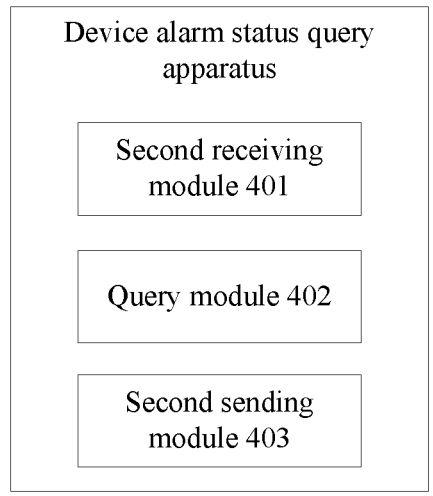
FIG. 5 is a schematic diagram of a device alarm status query apparatus according to an embodiment of the present disclosure.

FIG. 5 is a schematic diagram of a device alarm status query apparatus according to an embodiment of the present disclosure. As shown in FIG. 5, the device alarm status query apparatus in the embodiments of the present disclosure includes a second receiving module 401, a query module 402, and a second sending module 403.

The second receiving module 401 is configured to receive, after a presentation apparatus updates a globally unique flag according to an alarm status change message, a query request sent by the presentation apparatus. The query request carries a device identifier set obtained by parsing the alarm status change message, and the device identifier set contains a device identifier of each device whose alarm status has changed.

In some exemplary implementations, the presentation apparatus updates the globally unique flag according to the alarm status change message.

In some exemplary implementations, the presentation apparatus may update the locally maintained globally unique flag as long as the alarm status change message is received.

In some exemplary implementations, the globally unique flag is a globally unique TiGID.

In some exemplary implementations, the query request carries the device identifier set, so that the query executer queries the alarm status of the device corresponding to each device identifier in the device identifier set.

The query module 402 is configured to query, according to the device identifier carried in the query request, the corresponding alarm status of the device.

In some exemplary implementations, the corresponding alarm status of the device stored in the query apparatus is queried according to the device identifier carried in the query request.

In some exemplary implementations, the query response carries the globally unique flag copied from the query request, and the alarm status of the device, corresponding to the device ID list in the query request, in the device alarm information.

The second sending module 403 is configured to return a query response to the presentation apparatus 403, so that the presentation apparatus determines whether to update the alarm status of the device according to the query response and the current globally unique flag.

In some exemplary implementations, the presentation apparatus determines whether to update the alarm status of the device according to a globally unique flag in the query response and the maintained globally unique flag.

In some exemplary implementations, when the globally unique flag carried in the query response is consistent with the current globally unique flag, the alarm status of the device corresponding to each device identifier in the query response is presented. When the globally unique flag carried in the query response is not consistent with the current globally unique flag, the query response is discarded without processing.

The embodiments of the present disclosure further provide a system for updating an alarm status of a device, including a collection apparatus, a presentation apparatus, and a query apparatus.

The collection apparatus is configured to periodically collect a device identifier set of devices whose alarm status has changed in a network, and send the device identifier set to a presentation apparatus through a device alarm status change message.

The presentation apparatus is configured to receive the device alarm status change message containing the device identifier set sent by the collection apparatus: update a globally unique flag according to the alarm status change message; and send a query request carrying the device identifier set to a query executer.

The query apparatus is configured to receive the query request for the alarm status of the device; and provide a corresponding query response according to the received query request.

The presentation apparatus is further configured to determine whether to update the alarm status of the device according to the query response returned by the query executer and the current globally unique flag.

Embodiment 5

Figure 6:
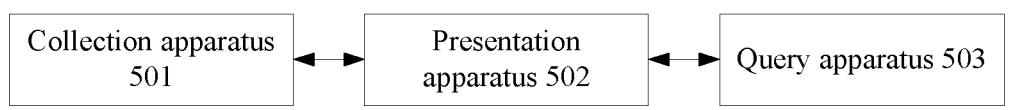
FIG. 6 is a schematic structural diagram of a system for updating an alarm status of a device according to an embodiment of the present disclosure.

FIG. 6 is a schematic structural diagram of a system for updating an alarm status of a device according to an embodiment of the present disclosure. As shown in FIG. 6, the system for updating the alarm status of the device in the embodiments of the present disclosure includes a collection apparatus 501, a presentation apparatus 502, and a query apparatus 503. As shown in FIG. 4, the presentation apparatus further includes a first receiving module 301, an update module 302, a first sending module 303, and a determination module 304.

In some exemplary implementations, the collection apparatus 501 is configured to periodically collect a device identifier set of devices whose alarm status has changed in a network, and send the device identifier set to the presentation apparatus 502 through a device alarm status change message.

In some exemplary implementations, the device identifier set is a device ID list, or a device identifier set equivalent to the device ID list.

In some exemplary implementations, the collection apparatus 501 is configured to periodically collect the device ID list of each device whose alarm status has changed in the network, and send the device alarm status change message to the presentation apparatus 502.

In some exemplary implementations, the presentation apparatus 502 is configured to receive the device alarm status change message sent by the collection apparatus 501.

In some exemplary implementations, the presentation apparatus 502 is configured to maintain a globally unique TiGID.

In some exemplary implementations, the presentation apparatus 502 is configured to obtain a new TiGID and overwrite the old TiGID, that is, update the TiGID, after receiving a new device alarm status change message.

In some exemplary implementations, the presentation apparatus 502 is configured to parse the device ID list of each device whose alarm status has changed from the device alarm status change message, and send a query request containing the TiGID and the device ID list of each device whose alarm status has changed to the query apparatus 503 to query the alarm status of the device corresponding to the device ID list of each device whose alarm status has changed.

In some exemplary implementations, the query apparatus 503 copies the TiGID in the query request.

The query apparatus 503 is configured to provide a corresponding query response according to the received query request.

In some exemplary implementations, the presentation apparatus 502 is configured to compare, after receiving the query response returned by the query apparatus 503 containing the copied TiGID and the alarm status of the device corresponding to the device ID list of each device whose alarm status has changed, the current TiGID maintained by the presentation apparatus with the TiGID in the query response to determine whether to present the alarm status in the query response.

In some exemplary implementations, the presentation apparatus 502 is configured to update, when the current TiGID is consistent with the TiGID in the query response, the display of the alarm status according to the alarm status of the device in the query response, and discard, when the current TiGID is inconsistent with the TiGID in the query response, the query response without any processing.

In some exemplary implementations, the first receiving module 301 is configured to receive the alarm status change message and parse the alarm status change message to obtain the device identifier set.

In some exemplary implementations, the update module 302 is configured to update a locally maintained globally unique flag according to the received alarm status change message.

In some exemplary implementations, the first sending module 303 is configured to send a query request carrying the device identifier set to a query executer, so that the query executer queries and determines the alarm status of the device corresponding to each device identifier in the device identifier set.

In some exemplary implementations, the determination module 304 is configured to update the alarm status of the device according to the current globally unique flag and a query response returned by the query executer.

In some exemplary implementations, the query apparatus 503 is configured to query, in the maintained device alarm information when receiving the query request sent by the query apparatus 502, the corresponding alarm status of the device according to the device ID list of each device whose alarm status has changed in the query request, copy the TiGID in the query request, and return the alarm status of the device and the copied TiGID to the presentation apparatus 502.

In some exemplary implementations, the query request carries the updated globally unique flag and the device ID list.

In some exemplary implementations, the query apparatus 503 is configured to query, in the maintained device alarm information, the alarm status of the device corresponding to the device identifier set, and return the corresponding alarm status of the device and the globally unique flag copied from the query request to the presentation apparatus 502.

In some exemplary implementations, the device identifier set is a device ID list, and the globally unique flag is a TiGID.

In some exemplary implementations, the query request contains following fields: a TiGID field, which records the current TiGID field maintained; and a device ID list field, which records the device ID list of each device whose alarm status has changed parsed from the alarm status change message.

Embodiment 6

Figure 7:
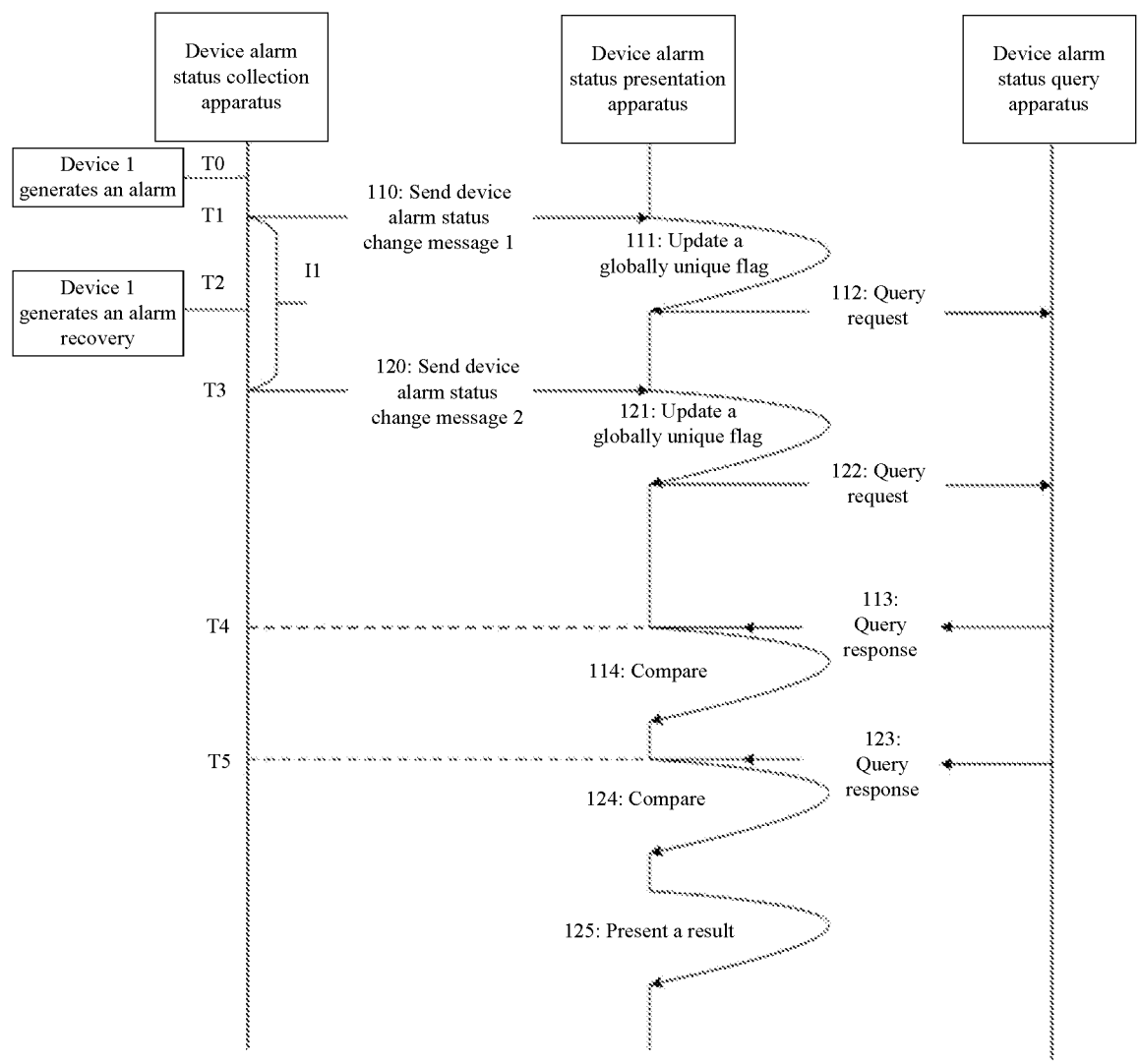
FIG. 7 is an exemplary flowchart of an implementation for updating an alarm status of a device according to an embodiment of the present disclosure.

FIG. 7 is an exemplary flowchart of an implementation for updating an alarm status of a device according to an embodiment of the present disclosure. The flow of the method for updating the alarm status of the device in the embodiments of the present disclosure will be described in detail below with reference to FIG. 7.

In the embodiments of the present disclosure, a timestamp is used as a TiGID for illustration, but the TiGID is not limited to the timestamp. The timestamp is in a format of Unix timestamp, that is, the total number of seconds from 00:00:00 GMT on Jan. 1, 1970 to the present. The method includes the following operations.

First, when an alarm occurs, device 1 generates an alarm at a moment T0.

At 110, a device alarm status change message 1 is sent.

In some exemplary implementations, a collection apparatus sends the device alarm status change message 1 to a presentation apparatus at a moment T1 (T1>T0 and T1−T0<I1).

In some exemplary implementations, a device ID list of devices whose alarm status has changed in the device alarm status change message 1 contains only device 1.

In some exemplary implementations, the device ID list of each device whose alarm status has changed in a network is collected periodically, so that although the alarm is generated at the moment T0, the device alarm status change message may be received at the moment T1.

At 111, a globally unique flag is updated.

In some exemplary implementations, the presentation apparatus receives the device alarm status change message 1 at the moment T1, and obtains a new TiGID=T1 and overwrites the old TiGID, that is, updates TiGID=T1.

At 112, a query request is sent.

In some exemplary implementations, the presentation apparatus parses the device ID list that only contains device 1 whose alarm status has changed from the device alarm status change message 1, and sends a query request containing an identifier sequence number corresponding to the moment T1 and the device ID list of the device whose alarm status has changed to a query apparatus to query the alarm status of device 1.

At 113, a query response is sent.

In some exemplary implementations, the query apparatus returns the alarm status (alarm) of device 1 queried in maintained device alarm information, and an identifier sequence number corresponding to the moment T1 copied from the query request to the presentation apparatus.

At 114, a comparison is performed.

In some exemplary implementations, the presentation apparatus receives the query response at a moment T4 (T4>T3) at which the current TiGID maintained by the presentation apparatus has been updated to an identifier sequence number corresponding to the moment T3 in S121, compares the current TiGID=T3 with the TiGID=T1 in the query response, and discards the query response without processing if the two TiGID are different.

Then, when an alarm recovery occurs, device 1 generates an alarm recovery at a moment T2.

At 120, a device alarm status change message 2 is sent.

In some exemplary implementations, the collection apparatus sends the device alarm status change message 2 (that is, the alarm status change message corresponding to the alarm recovery) to the presentation apparatus at the moment T3 (0<T3−T2<I1 and T3=T1+I1).

In some exemplary implementations, the device ID list of the device whose alarm status has changed in the device alarm status change message 2 contains only device 1.

At 121, the globally unique flag is updated.

In some exemplary implementations, the presentation apparatus receives the device alarm status change message 2 (that is, the alarm status change message corresponding to the alarm recovery) at the moment T3, and obtains a new TiGID=T3 and overwrites the old TiGID, that is, updates TiGID=T3.

At 122, a query request is sent.

In some exemplary implementations, the presentation apparatus parses the device ID list that only contains device 1 whose alarm status has changed from the device alarm status change message 2, and sends a request containing an identifier sequence number corresponding to the moment T3 and the device ID list of the device whose alarm status has changed to the query apparatus to query the alarm status of device 1.

At 123, a query response is sent.

In some exemplary implementations, the query apparatus returns the alarm status (alarm recovery) of device 1 queried in the maintained device alarm information, and an identifier sequence number corresponding to the moment T3 copied from the query request to the presentation apparatus.

At 124, a comparison is performed.

In some exemplary implementations, the presentation apparatus receives the query response at a moment T5 (T5>T4), compares the current TiGID=T3 with the TiGID=T3 in the query response, and continues processing the query response if the two TiGID are the same.

At 125, a result is presented.

In some exemplary implementations, the presentation apparatus updates the display of the alarm status according to the alarm status (alarm recovery) of device 1 contained in the query response.

In some exemplary implementations, the final alarm status of device 1 is presented as the alarm recovery in the presentation apparatus.

In some exemplary implementations, the corresponding presentation is performed according to the alarm status (alarm recovery).

Embodiment 7

Figure 8:
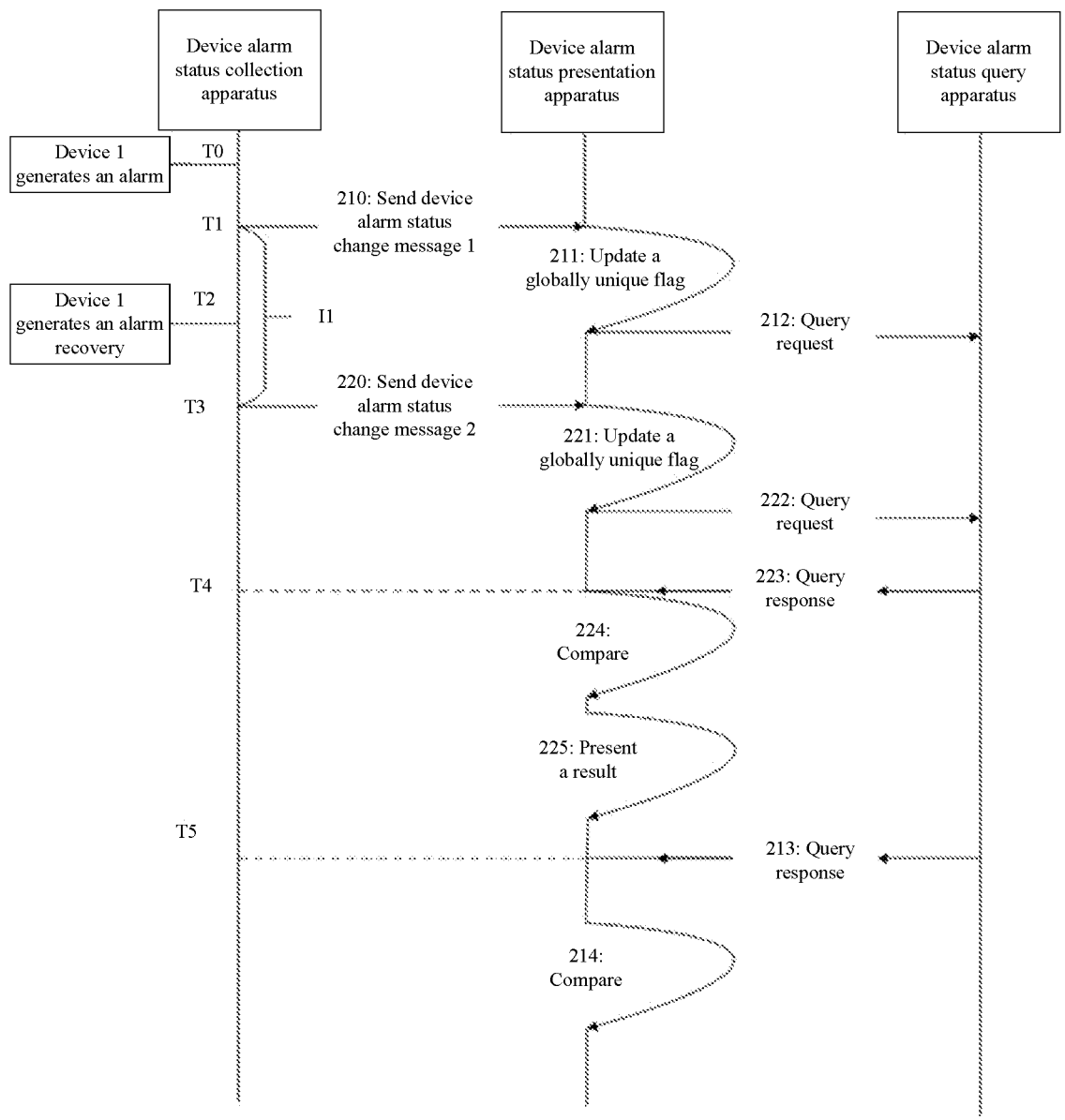
FIG. 8 is an exemplary flowchart of another implementation for updating an alarm status of a device according to an embodiment of the present disclosure.

FIG. 8 is an exemplary flowchart of another implementation for updating an alarm status of a device according to an embodiment of the present disclosure. The flow of the method for updating the alarm status of the device in the embodiments of the present disclosure will be described in detail below with reference to FIG. 8.

The processing flow of updating the alarm status of the device in the embodiment is as shown in FIG. 8, and a TiGID is the same as that in Embodiment 6. The method includes the following operations.

First, when an alarm occurs, device 1 generates an alarm at a moment T0.

At 210, a device alarm status change message 1 is sent.

In some exemplary implementations, a collection apparatus sends the device alarm status change message 1 to a presentation apparatus at a moment T1 (T1>T0 and T1−T0<I1).

In some exemplary implementations, the device ID list of the device whose alarm status has changed in the device alarm status change message 1 contains only device 1.

At 211, a globally unique flag is updated.

In some exemplary implementations, the presentation apparatus receives the device alarm status change message 1 at the moment T1, and obtains a new TiGID=T1 and overwrites the old TiGID, that is, updates TiGID=T1.

At 212, a query request is sent.

In some exemplary implementations, the presentation apparatus parses the device ID list that only contains device 1 whose alarm status has changed from the device alarm status change message 1, and sends a query request containing an identifier sequence number corresponding to the moment T1 and the device ID list of the device whose alarm status has changed to a query apparatus to query the alarm status of device 1.

At 213, a query response is sent.

In some exemplary implementations, the query apparatus returns the alarm status (alarm) of device 1 queried in maintained device alarm information, and an identifier sequence number corresponding to the moment T1 copied from the query request to the presentation apparatus.

At 214, a comparison is performed.

In some exemplary implementations, the presentation apparatus receives the query response at a moment T5 (T5>T4>T3) at which the current TiGID maintained by the presentation apparatus has been updated to an identifier sequence number corresponding to the moment T3 in S221, compares the current TiGID=T3 with the TiGID=T1 in the query response, and discards the query response without processing if the two TiGID are different.

Then, when an alarm recovery occurs, device 1 generates an alarm recovery at the moment T2.

At 220, a device alarm status change message 2 is sent.

In some exemplary implementations, the collection apparatus sends the device alarm status change message 2 (that is, the alarm status change message corresponding to the alarm recovery) to the presentation apparatus at the moment T3 (0<T3−T2<I1 and T3=T1+I1).

In some exemplary implementations, the device ID list of the device whose alarm status has changed in the device alarm status change message 2 contains only device 1.

At 221, the globally unique flag is updated.

In some exemplary implementations, the presentation apparatus receives the device alarm status change message 2 (that is, the alarm status change message corresponding to the alarm recovery) at the moment T3, and obtains a new TiGID=T3 and overwrites the old TiGID, that is, updates TiGID=T3.

At 222, a query request is sent.

In some exemplary implementations, the presentation apparatus parses the device ID list that only contains device 1 whose alarm status has changed from the device alarm status change message 2, and sends a request containing an identifier sequence number corresponding to the moment T3 and the device ID list of the device whose alarm status has changed to the query apparatus to query the alarm status of device 1.

At 223, a query response is sent.

In some exemplary implementations, the query apparatus returns the alarm status (alarm recovery) of device 1 queried in maintained device alarm information, and the identifier sequence number corresponding to the moment T3 copied from the query request to the presentation apparatus.

At 224, a comparison is performed.

In some exemplary implementations, the presentation apparatus receives the query response at a moment T5 (T3<T4<T5), compares the current TiGID=T3 with the TiGID=T3 in the query response, and continues processing the query response if the two TiGID are the same.

At 225, a result is presented.

In some exemplary implementations, the presentation apparatus updates the display of the alarm status according to the alarm status (alarm recovery) of device 1 contained in the query response.

In some exemplary implementations, the final alarm status of device 1 is presented as the alarm recovery in the presentation apparatus.

In some exemplary implementations, the corresponding presentation is performed according to the alarm status (alarm recovery).

Embodiment 8

Figure 9:
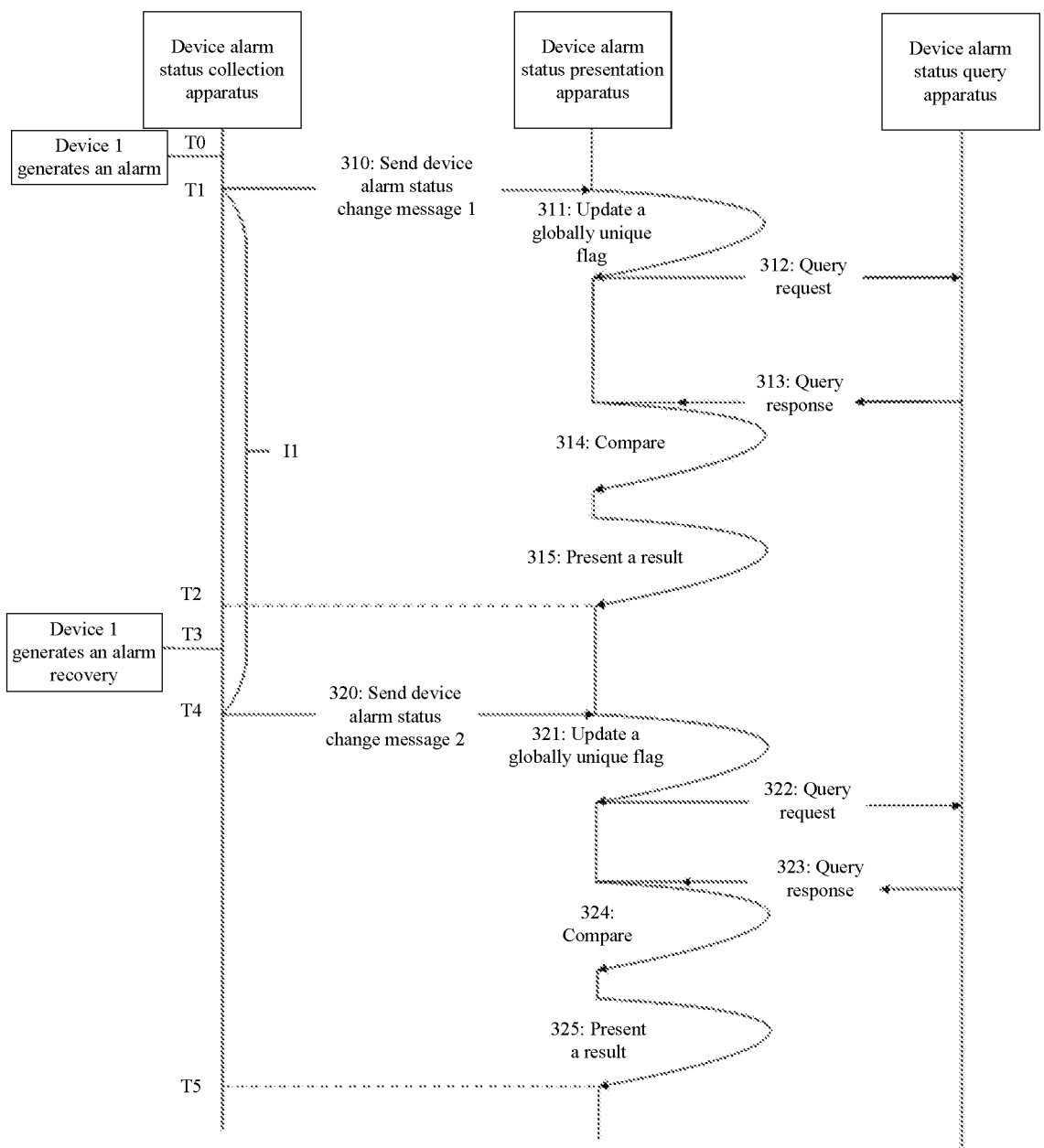
FIG. 9 is an exemplary flowchart of still another implementation for updating an alarm status of a device according to an embodiment of the present disclosure.

FIG. 9 is an exemplary flowchart of still another implementation for updating an alarm status of a device according to an embodiment of the present disclosure. The flow of the method for updating the alarm status of the device in the embodiments of the present disclosure will be described in detail below with reference to FIG. 9.

The processing flow of updating the alarm status of the device in the embodiment is as shown in FIG. 9, and a TiGID is the same as that in Embodiment 6. The method includes the following operations.

First, when an alarm occurs, device 1 generates an alarm at a moment T0.

At 310, a device alarm status change message 1 is sent.

In some exemplary implementations, a collection apparatus sends the device alarm status change message 1 to a presentation apparatus at a moment T1 (T1>T0 and T1−T0<I1).

In some exemplary implementations, the device ID list of the device whose alarm status has changed in the device alarm status change message 1 contains only device 1.

At 311, a globally unique flag is updated.

In some exemplary implementations, the presentation apparatus receives the device alarm status change message 1 at the moment T1, and obtains a new TiGID=T1 and overwrites the old TiGID, that is, updates TiGID=T1.

At 312, a query request is sent.

In some exemplary implementations, the presentation apparatus parses the device ID list that only contains device 1 whose alarm status has changed from the device alarm status change message 1, and sends a query request containing an identifier sequence number corresponding to the moment T1 and the device ID list of the device whose alarm status has changed to a query apparatus to query the alarm status of device 1.

At 313, a query response is sent.

In some exemplary implementations, the query apparatus returns the alarm status (alarm) of device 1 queried in maintained device alarm information, and the identifier sequence number corresponding to the moment T1 copied from the query request to the presentation apparatus.

At 314, a comparison is performed.

In some exemplary implementations, the presentation apparatus receives the query response, where the current TiGID maintained by the presentation apparatus is the identifier sequence number corresponding to the moment T1, compares the current TiGID=T1 with the TiGID=T1 in the query response, and continues processing the query response if the two TiGID are the same.

At 315, a result is presented.

In some exemplary implementations, the presentation apparatus updates the display of the alarm status at a moment T2 according to the alarm status of device 1 contained in the query response.

Then, when an alarm recovery occurs, device 1 generates an alarm recovery at a moment T3 (T3>T2).

At 320, a device alarm status change message 2 is sent.

In some exemplary implementations, the collection apparatus sends the device alarm status change message 2 (that is, the alarm status change message corresponding to the alarm recovery) to the presentation apparatus at a moment T4 (0<T4−T3<I1 and T4=T1+I1).

In some exemplary implementations, the device ID list of the device whose alarm status has changed in the device alarm status change message 2 contains only device 1.

At 321, the globally unique flag is updated.

In some exemplary implementations, the presentation apparatus receives the device alarm status change message 2 (that is, the alarm status change message corresponding to the alarm recovery) at the moment T4, and obtains a new TiGID=T4 and overwrites the old TiGID, that is, updates TiGID=T4.

At 322, a query request is sent.

In some exemplary implementations, the presentation apparatus parses the device ID list that only contains device 1 whose alarm status has changed from the device alarm status change message 2, and sends a query request containing an identifier sequence number corresponding to the moment T4 and the device ID list of the device whose alarm status has changed to a query apparatus to query the alarm status of device 1.

At 323, a query response is sent.

In some exemplary implementations, the query apparatus returns the alarm status (alarm recovery) of device 1 queried in maintained device alarm information, and the identifier sequence number corresponding to the moment T4 copied from the query request to the presentation apparatus.

At 324, a comparison is performed.

In some exemplary implementations, the presentation apparatus receives the query response, compares the current TiGID=T4 with the TiGID=T4 in the query response, and continues processing the query response if the two TiGID are the same.

At 325, the result is presented.

In some exemplary implementations, the presentation apparatus updates the display of the alarm status at a moment T5 according to the alarm status (alarm recovery) of device 1 contained in the query response.

In some exemplary implementations, the final alarm status of device 1 is presented as the alarm recovery in the presentation apparatus.

In some exemplary implementations, the corresponding presentation is performed according to the alarm status (alarm recovery).

Embodiment 9

Figure 10:
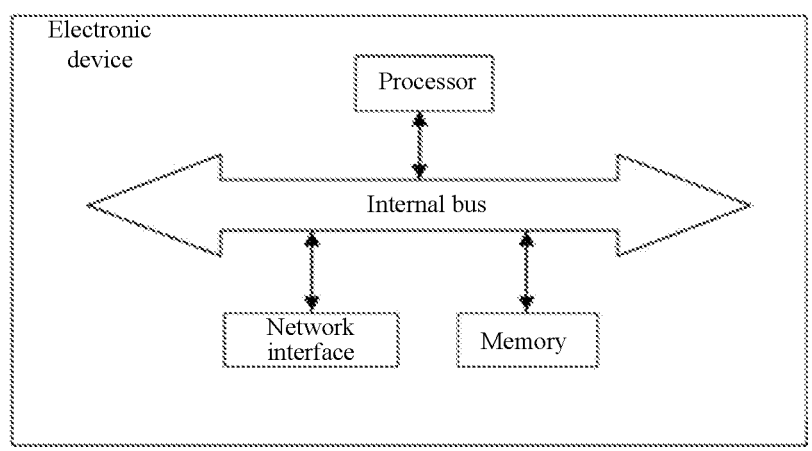
FIG. 10 is a schematic structural diagram of an electronic device according to an embodiment of the present disclosure.

FIG. 10 is a schematic structural diagram of an electronic device according to an embodiment of the present disclosure. As shown in FIG. 10, in a hardware level, the electronic device includes a processor, and optionally an internal bus, a network interface, and a memory. The memory may include an internal memory, such as a high-speed Random-Access memory (RAM), and may further include a non-volatile memory, such as at least one magnetic disk memory. Of course, the electronic device may further include hardware required by other services.

The processor, the network interface, and the memory may be connected to each other through the internal bus. The internal bus may be an Industry Standard Architecture (ISA) bus, a Peripheral Component Interconnect (PCI) bus, or an Extended Industry Standard Architecture (EISA) bus. The bus may be classified into an address bus, a data bus, a control bus, etc. For ease of presentation, only a bidirectional arrow is used in FIG. 10, but this does not mean that there is only one bus or one type of bus.

The memory is configured to store a program. Specifically, the program may include a program code. The program code includes a computer operation instruction.

The processor reads a corresponding computer program from the non-volatile memory into the memory and then runs, and logically forms a shared resource access control device. The processor executes the program stored in the memory and is specifically configured to perform the method for updating the alarm status of the device in the above Embodiment 1.

Embodiment 10

Embodiment 10 in the embodiments of the present disclosure is also a structural diagram of an electronic device as shown in FIG. 10. The only difference between the embodiment of the present disclosure and Embodiment 9 is that the processor in the embodiment of the present disclosure performs the method for updating the alarm status of the device in the above Embodiment 2.

Embodiment 11

The embodiments of the present disclosure further provide a computer-readable storage medium. The computer-readable storage medium stores one or more programs including instructions. When executed by a portable electronic device including a plurality of application programs, the instructions enable the portable electronic device to execute the method of the embodiment shown by the method in the figures, and are specifically configured to perform the method for updating the alarm status of the device in the above Embodiment 1.

Embodiment 12

The embodiments of the present disclosure further provide a computer-readable storage medium. The computer-readable storage medium stores one or more programs including instructions. When executed by a portable electronic device including a plurality of application programs, the instructions enable the portable electronic device to execute the method of the embodiment shown by the method in the figures, and are specifically configured to perform the method for updating the alarm status of the device in the above Embodiment 2.

Although the implementations disclosed in the present disclosure are as above, the contents are the implementations only adopted for facilitating understanding the present disclosure, but not intended to limit the present disclosure. Any having ordinary skill in the art of the present disclosure may make any modification and change on implementation forms and details without departing from the principle and scope disclosed by the present disclosure, but the scope of protection of the present disclosure is still subject to the scope limited by the claims attached.

What is claimed is:

1. A method for updating an alarm status of a device in a network management system, performed by a device alarm status presentation apparatus of the network management system, comprising:
    parsing an alarm status change message received from a device alarm status change collection apparatus of the network management system to obtain a device identifier set, wherein the device identifier set contains a device identifier of each device whose alarm status has changed;
    updating a globally unique flag according to the alarm status change message and maintaining the globally unique flag, wherein the globally unique flag is globally unique within the network management system;
    sending a query request carrying the globally unique flag and the device identifier set to a device alarm status query apparatus of the network management system; and
    determining whether to update the alarm status of the device according to the current globally unique flag maintained by the device alarm status presentation apparatus and a query response returned by the device alarm status query apparatus, wherein the query response carries the globally unique flag carried in the query request and the alarm status of the each device corresponding to the device identifier in the device identifier set.

2. The method according to claim 1, wherein determining whether to update the alarm status of the device according to the current globally unique flag maintained by the device alarm status presentation apparatus and a query response returned by the device alarm status query apparatus further comprises:
    determining whether the globally unique flag carried in the query response is consistent with the current globally unique flag maintained by the device alarm status presentation apparatus; when the globally unique flag carried in the query response is consistent with the current globally unique flag maintained by the device alarm status presentation apparatus, presenting the alarm status of the device corresponding to each device identifier in the query response; and when the globally unique flag carried in the query response is not consistent with the current globally unique flag maintained by the device alarm status presentation apparatus, discarding the query response without processing.

3. The method according to claim 1, wherein the globally unique flag is a Time-increasing Global ID (TiGID) maintained by the device alarm status presentation apparatus; and the device identifier set is a device ID list.

4. The method according to claim 3, wherein the query request contains following fields:
    a TiGID field, which records the current TiGID maintained by the device alarm status presentation apparatus; and
    a device ID list field, which records the device ID list parsed from the alarm status change message.

5. The method according to claim 4, further comprising: receiving the query response returned by the device alarm status query apparatus, wherein the query response contains the alarm status of the device, corresponding to the device ID list in the query request, in device alarm information, and the TiGID.

6. A method for updating an alarm status of a device in a network management system, performed by a device alarm status query apparatus of the network management system, comprising:
    after a device alarm status presentation apparatus of the network management system updates a globally unique flag according to an alarm status change message received from a device alarm status change collection apparatus of the network management system, receiving a query request sent by the device alarm status presentation apparatus, wherein the globally unique flag is globally unique within the network management system, the query request carries the globally unique flag and a device identifier set obtained by parsing the alarm status change message, and the device identifier set contains a device identifier of each device whose alarm status has changed;
    querying the corresponding alarm status of the each device according to the device identifier carried in the query request; and
    providing a corresponding query response for the device alarm status presentation apparatus, so that the device alarm status presentation apparatus determines whether to update the alarm status of the device according to the query response and the current globally unique flag maintained by the device alarm status presentation apparatus, wherein the query response carries the globally unique flag carried in the query request and the alarm status of the each device corresponding to the device identifier in the device identifier set.

7. A network management system for updating an alarm status of a device in a network management system, the network management system comprising:
- a device alarm status change collection apparatus, configured to periodically collect a device identifier set of devices whose alarm status has changed in a network, and send the device identifier set to a device alarm status presentation apparatus through an alarm status change message;
- the device alarm status presentation apparatus, configured to receive the alarm status change message containing the device identifier set sent by the device alarm status change collection apparatus; update a globally unique flag according to the alarm status change message and maintain the globally unique flag, wherein the globally unique flag is globally unique within the network management system; and send a query request carrying the globally unique flag and the device identifier set to a device alarm status query apparatus; and
- the device alarm status query apparatus, configured to receive the query request for the alarm status of the device; and provide a corresponding query response according to the received query request, wherein the query response carries the globally unique flag carried in the query request and the alarm status of the each device corresponding to the device identifier in the device identifier set;
- wherein the device alarm status presentation apparatus is further configured to determine whether to update the alarm status of the device according to the query response returned by the device alarm status query apparatus and the current globally unique flag maintained by the device alarm status presentation apparatus.

8. An electronic device, comprising:
a processor; and
a memory, configured to store a computer-executable instruction, wherein the computer-executable instruction, when being executed by the processor, causes the processor to perform the operations of the method for updating the alarm status of the device according to claim 1.

9. An electronic device, comprising:
a processor; and
a memory, configured to store a computer-executable instruction, wherein the computer-executable instruction, when being executed by the processor, causes the processor to perform the operations of the method for updating the alarm status of the device according to claim 6.

10. A non-transitory computer-readable storage medium, wherein the computer-readable storage medium stores one or more programs, and the one or more programs are executed to perform the operations of the method for updating the alarm status of the device according to claim 1.

11. A non-transitory computer-readable storage medium, wherein the computer-readable storage medium stores one or more programs, and the one or more programs are executed to perform the operations of the method for updating the alarm status of the device according to claim 6.

12. The method according to claim 3, wherein updating a globally unique flag according to the alarm status change message comprises:
each time the device alarm status change message is received, obtaining a new TiGID and overwriting an old TiGID, so as to update the TiGID.

13. The method according to claim 3, wherein the TiGID is a timestamp.

14. The method according to claim 6, wherein the globally unique flag is a Time-increasing Global ID (TiGID) maintained by the device alarm status presentation apparatus; and the device identifier set is a device ID list.

15. The method according to claim 14, wherein the query request contains following fields:
- a TiGID field, which records the current TiGID maintained by the device alarm status presentation apparatus; and
- a device ID list field, which records the device ID list parsed from the alarm status change message.

16. The method according to claim 15, wherein the query response contains the alarm status of the device, corresponding to the device ID list in the query request, in device alarm information, and the TiGID.

17. The method according to claim 14, wherein querying the corresponding alarm status of the each device according to the device identifier carried in the query request comprises:
querying, in maintained device alarm information, the corresponding alarm status of the device according to the device ID list of the each device whose alarm status has changed in the query request.

18. The method according to claim 17, wherein after receiving the query request, the method further comprises:
copying the TiGID from the query request; and
generating the query response, wherein the query response carries the TiGID copied from the query request, and the corresponding alarm status of the device queried in the maintained device alarm information according to the device ID list of the each device whose alarm status has changed in the query request.

19. The method according to claim 14, wherein the TiGID is a timestamp.

20. The system according to claim 7, wherein the globally unique flag is a Time-increasing Global ID (TiGID) maintained by the device alarm status presentation apparatus; and the device identifier set is a device ID list.

* * * * *